| [54] | OPEN CELL BODY MADE OF HARD VINYL CHLORIDE RESIN |
|---|---|
| [75] | Inventors: Tatsuo Waki; Takeshi Watanabe; Kazuo Suzuki, all of Ibaraki, Japan |
| [73] | Assignee: Lonseal Corporation, Tokyo, Japan |
| [21] | Appl. No.: 107,029 |
| [22] | Filed: Oct. 13, 1987 |
| [30] | Foreign Application Priority Data |

Oct. 21, 1986 [JP] Japan ............... 61-251325

| [51] | Int. Cl.[4] ............... C08J 9/10 |
|---|---|
| [52] | U.S. Cl. ............... 521/84.1; 521/88; 521/93; 521/134; 521/139; 521/145 |
| [58] | Field of Search ......... 521/134, 145, 84.1, 521/93, 88 |

[56] References Cited

U.S. PATENT DOCUMENTS

| 3,717,595 | 2/1973 | Huntzinger et al. ............... 521/145 |
|---|---|---|
| 3,975,315 | 8/1976 | Parks ............... 521/145 |
| 4,025,465 | 5/1977 | Dorrn et al. ............... 521/145 |
| 4,226,943 | 10/1980 | Tsurushige et al. ............... 521/73 |
| 4,427,795 | 1/1984 | Dorrestijn et al. ............... 521/145 |
| 4,701,472 | 10/1987 | Koebisu et al. ............... 521/145 |

FOREIGN PATENT DOCUMENTS

| 53-21898 | 7/1978 | Japan . |
|---|---|---|
| 55-137930 | 10/1980 | Japan . |
| 56-90841 | 7/1981 | Japan . |
| 57-14630 | 1/1982 | Japan . |
| 58-25369 | 5/1983 | Japan . |
| 58-50662 | 11/1983 | Japan . |
| 58-58370 | 12/1983 | Japan . |

*Primary Examiner*—Morton Foelak
*Attorney, Agent, or Firm*—Sandler & Greenblum

[57] ABSTRACT

An open cell body is made of hard vinyl chloride resin made by extruding a compound composition consisting essentially of a vinyl chloride resin made by a suspension polymerization method or a block polymerization method, an ultramacromolecular weight acrylic processing aid, joint use of an organic stabilizer containing a metal of the group I in the periodic table and an organic stabilizer containing a metal of the group II in the periodic table, or an organic composite stabilizer containing the both metals, joint use of an anionic surface active agent and a nonionic surface active agent, or joint use of an anionic surface active agent and a low polymerization degree polyolefin or waxes, a thermal decomposing organic blowing agent such as azodicarbonamide, and, as occasion demands, a powdery filler such as calcium carbonate.

50 Claims, No Drawings

OPEN CELL BODY MADE OF HARD VINYL CHLORIDE RESIN

BACKGROUND OF THE INVENTION

1. Field of the Invention

The present invention relates to a novel open cell body made of hard vinyl chloride resin used for purposes, such as duct pipes, aeration pipes, pits for surface dewatering, various air filters, solid-gas separating plates, solid-liquid separating plates, mother materials of deodorizers, and carriers of aromatics.

2. Description of Background and Material Information

Conventionally, open cell bodies made of synthetic resins, and flexible urethan foams obtained by the reaction of saturated polyesters or polyethers with isocyanate have become popular. Moreover, PVA sponges obtained by adding α-starch powders to polyvinyl alcohols as a foaming agent to formalize it and then flowing out the resulting product with water are also well known.

Related to this, open cell bodies made of vinyl chloride resins are disclosed in the inventions of Japanese Patent Publication No. 21898/1978, U.S. Pat. No. 4,226,943, Japanese patent application OPI Nos. 137930/1980 (Japanese Patent Publication No. 50662/1983), 90841/1981 (Japanese Patent Publication No. 25369/1983), and 14630/1982 (Japanese Patent Publication No. 58370/1983).

Jap. Pat. Pub. No. 21898/1978 and U.S. Pat. No. 4,226,943, both of which were filed by Otsuka Chemical Pharmaceuticals Co., Ltd., disclose "a method for producing an open cell body by molding a mixture containing at least one kind of vinyl chloride emulsified homopolymers and vinyl chloride emulsified copolymers, a plasticizer, and a blowing agent into a sheet followed by heating, which is characterized by adding at least one kind of wax which is selected from paraffin waxes having 20-80 carbon atoms and ester waxes having 20-80 carbon atoms consisting of monohydric and polyhydric alcohol esters of higher fatty-basic acid and also having substantially no compatibility with the vinyl chloride polymer to the mixture to obtain the open cell body" (Jap. Pat. Pub. No. 21898/1978), and also "a process for producing an open cell sheet made of a vinyl chloride resin which involves molding a foaming vinyl chloride resin composition into a sheet and heating the sheet to the temperature of decomposition of the blowing agent in the sheet or more, wherein the foaming vinyl chloride resin composition consisting of:

(1) a vinyl chloride resin of 100 PHR,
(2) a plasticizer of 30-150 PHR,
(3) a synthetic hydrogen carbonate wax of 1-8 PHR: a product produced in a step selected from the group consisting of depolymerization of polyethylene, polymerization of ethylene, and Fischer-Tropsch synthesis of coal gas, which has a molecular weight of 1500-7000, a softening point of 90°-135° C., and a grain size of 10-100 microns,
(4) an alkali metal-Zn stabilizer of 1-5 PHR, and
(5) a decomposing type organic blowing agent of 2-10 PHR, which contains at least 60% of azodicarbonamide" (claim 10 of U.S. Pat. No. 4,226,943).

Although the latter invention does not specify that the vinyl chloride resin is an emulsified polymer, the use of a vinyl chloride resin "produced by emulsion polymerization" is clearly defined in the specification thereof, so that the vinyl chloride resin in the latter invention is an open cell body by means of an application method using the same emulsified polymer resin as in the former. The inventions described in these Jap. Pat. Pub. No. 21898/1978 and U.S. Pat. No. 4,226,943 can be summarized as follows:

① A vinyl chloride resin by emulsion polymerization is employed.
② The resultant product is a soft product containing a large quantity of a plasticizer therein.
③ A thermal decomposing type blowing agent is employed.
④ As essential components, (1) waxes are added (Jap. Pat. Pub. No. 21898/1978), (2) waxes and an alkali metal-Zn stabilizer are added.
⑤ Other necessary components are added to make a paste paint.
⑥ The resultant paint is applied on the base material, which is gellated to process into a sheet.
⑦ The sheet is foamed by heating in a foaming furnace to produce an open cell body.

The inventions of Jap. Pat. Appln. OPI Nos. 137930/1980 (Jap. Pat. Pub. No. 50662/1983), 90841 (Jap. Pat. Pub. No. 25369/1983), and 14630/1982 (Jap. Pat. Pub. No. 58370/1983) were developed by the inventors of the present invention (the latter two) and constitutes the basis of the present invention.

The invention of Jap. Pat. Appln. OPI No. 137930 (Jap. Pat. Pub. No. 50662/1983) is directed to "a process for producing an open cell body characterized by kneading with heating a substance compounded by adding a plasticizer, a mixed or composite stabilizer, in which an organic stabilizer containing a metal of the group I in the periodic table and an organic stabilizer containing zinc and other metals are combined, a thermal decomposing type chemical blowing agent powder, such as azodicarbonamide generally used as a blowing agent to form closed cells, and, as occasion demands, other compounding agents, to a vinyl chloride resin generally used for plastisol, (ii) rolling the resulting substance into a sheet by means of a calender method or an extrusion method, and then (iii) heating said sheet to a temperature sufficient to decompose the blowing agent".

The invention of Jap. Pat. Appln. OPI No. 90841/1981 (Jap. Pat. Pub. No. 25369/1983) is directed to "a process for producing an open cell body characterized by (i) kneading with heating a compounded substance which contains a widely used vinyl chloride resin produced by a suspension polymerization method as the main component a followed by (ii) adding the combination of an organic stabilizer containing a metal of the group I in the periodic table and an organic stabilizer containing a metal of the group II in the periodic table, or an organic stabilizer containing both of the group I metal and the group II metal in the same table, and a surface active agent selected from the group consisting of the combination of an anionic surface active agent and a nonionic surface active agent, and combination of an anionic surface active agent and a low polymerization degree polyolefin or waxes, a plasticizer, a thermal decomposing blowing agent, such as azodicarbonamide generally used for production of closed cell body, and, as occasion demands, other compounding agents, such as a filler to the vinyl chloride resin, (iii) rolling it into a sheet by means of a calender method or an extrusion method, and then (iv) heating and foaming said sheet by passing it through a foaming furnace".

The invention of Jap. Pat. Appln. OPI No. 14630/1982 (Jap. Pat. Pub. No. 58370/1983) is directed to "a process for producing an open cell body characterized by (i) kneading with heating a compounded substance in which 4,4'-oxybis(benzenehydrazide) as a blowing agent and an anionic surface active agent are added to a vinyl chloride composition (containing a vinyl chloride resin, a plasticizer, a stabilizer, a filler, and the like) to mold it into a sheet, and then (iii) foaming said sheet by heating."

The technical idea common to these three inventions is summarized as follows. Namely, it can be divided under five headings:
(1) A sheet material is first formed using a calender technique (or an extruding technique) as processing method, followed by heating again in a foaming furnace to produce a foamed sheet.
(2) A resin formed by a suspension polymerization method is used as the vinyl chloride resin (a paste grade product is used only in Jap. Pat. Appln. OPI No. 137930/1980).
(3) The resultant product is a soft product containing 55-80 PHR of a plasticizer.
(4) A mixture or composite stabilizer of stabilizers containing the group I metal in the periodic table and the group II metal in the periodic table is used as the stabilizer.
(5) A surface active agent is added.

The products of these inventions are suitable for the uses, such as trim materials of car and upholstry covering materials, so that many of them are laminated with lining fabrics, such as knitted fabrics, plain fabrics, and nonwoven fabrics. These inventions, including the above Jap. Pat. Pub. 21898/1983 and U.S. Pat. No. 4,226,943 are extremely effective for such purposes, but could never be applied to production of the hard products, particularly, pipe-form products and plate products.

In the open cell hard products, for example a large quantity of the plasticizer should not be used, and if it is added (the purpose of the addition of the plasticizer is to act as processing aid so as to make the extrusion processing easy, and softening is not intended), the amount is as relatively small, i.e., 10-15 PHR. Accordingly, the thermal and kneading behaviors of hard products are quite different from those of the soft products.

The pipes or plate products are produced by extrusion techniques, but in this case, continuous foaming must be caused at a point in time when the product passes through an extruding die, and thus a method to obtain open cell bodies by first processing the vinyl chloride into a sheet by a calendering and then foaming the sheet by heating again, as in the conventional method, can not be applied. Therefore, in producing the hard open cell product, the steps of gellating and fusing the resin by heating and kneading in the extruder, at the same time decomposing and gasifying the blowing agent, simultaneously foaming the product as it passes through the extruding die, and forming the foam into an open cell body are required. The requirement for the steps can be achieved only by a completely novel technical idea which has never been found in the above conventional inventions and the purpose of the present invention lies in this point.

SUMMARY OF THE INVENTION

The present invention has been developed to satisfy the above requirements and provides an open cell body made of a hard vinyl chloride resin composed of the following compounded composition. Namely, it provides an open cell body made of hard vinyl chloride resin which comprises extruding the compounded composition consisting of:
(1) a vinyl chloride resin formed by a suspension polymerization method or a block polymerization method.
(2) an ultramacromolecular weight acrylic processing aid,
(3) a mixture an organic stabilizer containing a metal of the group I in the periodic table and an organic stabilizer containing a metal of the group II in the periodic table, or a mixture of an organic composite stabilizer containing both metals,
(4) a mixture of an anionic surface active agent and a nonionic surface active agent, or a mixture of an anionic surface active agent and a low polymerization degree polyolefin or waxes,
(5) a thermal decomposing type organic blowing agent, such as azodicarbonamide, and
(6) as occasion demands, a powderly filler, such as calcium carbonate.

From these results (Examples 1-8 and Comparative Examples 1-18), it is easily understood that open cell bodies made of hard vinyl chloride resins can be easily and effectively be obtained by means of an extrusion method, which production has been conventionally considered impossible. When these open cell bodies are obtained by an extrusion method, it is essential to use a compounded composition consisting of a vinyl chloride resin having a polymerization degree ($\bar{P}$) ranging from 400 to 1500, more preferably 450 to 1000, for example produced by a suspension polymerization method or block polymerization method, an ultramacromolecular weight acrylic processing aid, an organic stabilizer containing the group I metal, such as Na and K and the group II metal such as Zn and Ca, a combination of an anionic surface active agent and a nonionic surface active agent or combination of an anionic surface active agent, and waxes or a low polymerization degree polyolefin, a thermal decomposing type chemical blowing agent, such as ADCA, and as occasion demands, a powderly filler such as calcium carbonate, and it is surprising that compositions other than this do not produce open cell bodies of hard vinyl chloride resin exhibiting characteristics in accordance with the present invention, despite the fact that each of the above compounding agents are materials seperately and independently used in the calender method and extruding method in each field, and only a series of their combination, as described above, can afford open cell bodies easily in a large quantity and at a low cost.

DETAILED DESCRIPTION OF THE INVENTION

The vinyl chloride resins used in the present invention are those obtained what is commonly referred to as a suspension polymerization or block polymerization which are mainly used in the calender processing method and the extrusion processing method, and what is commonly referred to as paste resins normally used in application or coating methods are not suitable.

In addition to the previously mentioned vinly chloride resins used in the present invention, vinyl chloride copolymers, such as vinyl chloride-vinyl acetate copolymer, vinyl chloride-ethylene copolymer, and ethylene-vinyl acetate-vinyl chloride ternary copolymer, as well as vinyl chloride straight polymers (homopolymer of vinyl chlorides) produced by suspension polymerization or block polymerization methods are suitable. These resins, of course, may be used independently or as a combination of a plurality of them, so that the specific examples of suitable vinyl chloride resins are not particularly limited. The polymerization degree ($\bar{P}$) of the vinyl chloride resin used in the present invention, however, is important because the degree of polymerization effects all the fluidity in extrusion by changing the polymerization degree of the vinyl chloride resin. In other words, with respect to a change of the fluidity, change of the fused viscosity ($\times 10^3$ poies) under high temperature (180° C.) and fixed load (70 kg), is closely connected with continuous foaming in extruding. Although fused viscosity is also affected by the kind and amount of processing aids used, the kind of stabilizers, and other compounding agents (surface active agents, lubricants, fillers, etc.), the polymerization degree of the vinyl chloride resin is the most important factor. The polymerization degrees ($\bar{P}$) of vinyl chloride resins are widely distributed ranging from low polymerization degree products of 300–600 to high (ultra-high) polymerization degree products of 3000–9000, but for the open cell body of the present invention, vinyl chloride resins having a polymerization degree ($\bar{P}$) of more than 400 and less than 1500, more preferably 450–1000, are used. In those having a polymerization degree higher than this, the fused viscosity is too high for extrusion to obtain the open cell structure, and also, when the heating temperature is raised to reduce the fused viscosity, the temperature in the extruder is abnormally increased, thereby resulting in degradation of the resin. The low polymerization degree products, m such as a polymerization degree ($\bar{P}$) of 300–400 are suitably used by adding to those having a polymerization degree ($\bar{P}$) of 700–1000 in a small amount, but when they are used independently, the fused viscosity becomes too low to obtain an excellent open cell body.

In the open cell body of the present invention, addition of a processing aid (or modifier) is a highly significant factor, and selection of the processing aid is also a highly significant factor.

In general, the processing aids (or modifiers) for vinyl chloride resins may be generally classified into:
1 those based on butadiene resins, such as ABS and MBS;
2 those based on olefin resins such as PE, CPE, and EVA;
3 those based on acrylate (RA) or methacrylate (RMA) resins;
4 those based on condensation type resins; and
5 others.

Processing aids based on butadiene resins are mainly used to reform the shock resistance in the hard products, among which ABS and MBS are prominent but unsuitable to the open cell body of the present invention. When used in the compounding system of the present invention, ABS and MBS are effective to reform the shock resistance, but do not afford the open cell body. This is believed to result from the heterogeneous presence of the rubber component as a fused composition in the copolymerization (or graft polymerization) components, such as ABS and MBS.

As to processing aids based on olefin resins, chlorinated polyethylene (CPE) is particularly effective for the open cell body of the present invention. Although ethylene-vinyl acetate copolymer (EVA) showed some effects, these effects are duplicative or compensating effects in the combination with the acrylic processing aids shown in the following type of processing based on acrylate or methyacrylate resins, particularly ultramacromolecular weight acrylic processing aids, and thus an excellent open cell body can not be obtained by independent use of these processing acids.

The effective CPEs in this relationship includes ERATHLEN 301A, 401A, and 351A, produced by Showa Denkon Co., Ltd., and DAISOLAC G-235 and H-135, produced by Osaka Soda Co., Ltd., and as EVA, SOARBLEN CI of The Nippon Synthetic Chemical Industry Co., Ltd.

Processing aids based on acrylate or methyacrylate resins which is generically referred to as acryl resin modifiers, was originally used for the purposes, such as improvement of workability, elevation of shock resistance, and addition of delustering effect, and has been found to have the following effects in the improvements of the workability in extrusion molding (blow molding):
(1) Improvement in surface gross;
(2) Reduction in torque of the extruder;
(3) Prevention of retentative degradation;
(4) Prevention of draw down;
(5) Increase in hot melt strength; and
(6) Increase in discharge amount.

Examples of such processing adis include METALBEN P-501 and P-551, produced by Mitsubishi Rayon Co., Ltd., KANE ACE PA-11 and PA-20, produced by Kanegafuchi Chemical Industry Co., Ltd., HIBLEN 401 and 402, produced by Nippon Zeon Co., Ltd., and ACRYLOID K-120N, K-120ND, K-125 and K-147, produced by Rohm & Haos Corporation. However, the conventional acryl resin processing aid is not effective alone as the processing aid of the present invention, and acts effectively by the duplicative or compensating effects in combination with the ultramacromolecular weight acrylic processing aid similar to the above CPE and EVA.

The effective processing aid for purposes of the present invention are ultramacromolecular weight acrylic processing aids, and their concrete commercial products include METABLEN P-530 and P-531 made by Hitsubishi Rayon Co., Ltd., and KANE ACE PA-50 made by Kanegafuchi Chemical Industry Co., Ltd., among which METABLEN P-530 and P-531 are particularly effective.

This ultramacromolecular weight acrylic processing aid Metablen P-530, according to the catalogue of the company, possess the following physical properties:
Apparent specific gravity—0.35 g/cc
True specific gravity—1.15 g/cc
Grain size—30 mesh pass 98% or more
Volatile component—1.0% or less
Color—white
and also exhibits the following characteristics: (1) gellation promoting effect, (2) effect on foaming extrusion molding, (3) effect on soft leather foaming, (4) effect on soft calender molding, (5) improvement in secondary molding property, (6) improvement in molding property of high filler amount molded products, (7) improvement in injection molding property, particularly jetting, (8) gum preventing effect in extrusion molding, and the like. A particular "effect on foaming extrusion molding" is its ability to to maintain high temperature and high foaming against hard foaming extrusion molding and form an homogeneous cell.

This characteristic is also exhibited in the open cell body of the present invention, and this processing aid shows an excellent effect, particularly in its combination with chlorinated polyethylene, and thus can be said to be an indispensable processing aid in practicing the present invention.

The ultramacromolecular weight acrylic processing aids and usual acrylic processing aids are divided by their molecular weights. As used herein the ultramacromolecular weight acrylic processing aids means those processing aids having a molecular weight of about 1,500,000 or more, while the usual acrylic processing aids have a molecular weight of 300,000–500,000. Accordingly, in practicing the present invention, the processing aid must be selected based on this division of molecular weight.

The amount of these processing aids used in accordance with the present invention varies depending on chlorinated polyethylene, usual acrylic processing aids, and ultramacromolecular weight acrylic processing aids. The former two are not effective in themselves to construct excellent open cell bodies, but bring duplicative and compensating effects by their combination with the ultramacromolecular weight acrylic processing aid. However, the chlorinated polethylene and the acrylic processing aid have different roles, so that they are used in different amounts. The chlorinated polyethylene is effective to properly reduce the fused viscosity of the vinyl chloride resin, making the foaming accompanied by decomposition of the blowing agent easy. Thus, the amount used is relatively large, such as 5–20 PHR (As used herein "PHR" means addition parts by weight against 100 parts by weight of vinyl chloride resin). When an EVA type reforming agent is used instead of chlorinated polyethylene, the amount used may be considered in the same level. Contrary to this, general acrylic processing aids, such as METABLEN P-501, are effective to give surface smoothing property and gloss to the extrusion moldings, exhibiting the full effect by addition of as little as 1–3 PHR, but they are not required in the case of CPE or effective when using the EVA type modifiers.

On the other hand, the ultramacromolecular weight acrylic processing aid has an effect to make the foaming by decomposition of the blowing agent fine and homogeneous, thus increasing the expansion ratio, and is used in the range of 3 to 15 PHR.

The stabilizer used in the present invention is extremely limitatively and characteristically selected. Basically, an organic stabilizer containing a metal of the group I in the periodic table and an organic stabilizer containing a metal of the group II in the same table are combined or jointly used, or an organic combination stabilizer or mixture containing both of these metals is used, as described in the invention of Jap. Pat. Pub. No. 25369/1983 filed previously by the present invnetors. The term organic stabilizer as used herein means salts of higher fatty acid, such as ricinolic acid, decanoic acid, lauric acid, stearic acid, octanoic acid, pyrrolidoncarboxylic acid, and 2 ethylhexoic acid with the above both metals, salts with organic acids such as aromatic carboxylic acid and heterocyclic carboxylic acid, salts with phenol compounds, salts with unsaturated fatty acids having double bonds in the molecules such as maleic acid and the like.

As the metals of the group I in the periodic table, lithium (Li), sodium (Na), and potassium (K) are effective as the stabilizer in the present invention, and as the metals of the group II in the periodic table, magnesium (Mg), calcium (Ca), zinc (Zn), strontium (Sr), cadmium (Cd), and barrium (Ba) are used. In using these organic stabilizers, those of single compound form, for example Naoctoate, containing the group I metal and Zn-stearate, containing the group II metal, may be used alone or in combination with each other, and also a stabilizer containing a plurality of the group I metals and a single compound containing a single metal of the group II or the converse may be combined.

According to recent developments in stabilizer technologies, the use of liquid composite stabilizers, wherein these acid salts are dissolved in paraffin type solvents and a stabilizing aid, such as organic phosphites, is added thereto, have increased, and in examples of using such stabilizers, they are normally referred to as as an organic composite stabilizer containing both metals of the group I and the group II, rather than combination or mixing of the single compounds with each other as described above. The examples of this stabilizer include MARK FL-22 and FL-23 produced by Adeka Argus Corp. These composite stabilizers contain Na as the group I metal and Zn or Ca as the group II metals, and thus only FL-22 or FL-23 may be added. Also, they may be used by combining with a liquid substance in which the above single compound is dissolved in a proper stabilizing aid.

In the present invention, the use of a surface active agent is an extremely significant factor as well as the selection of the stabilizer, and joint use of an anionic surface active agent and a nonionic surface active agent is essentially required. In this case, the independent or separate use of the anionic surface active agent does not result in construction of excellent open cells, and the same may be said in the case of the independent use of the nonionic surface active agent, so that the joint use of the both surfactants have been found to be essentially required.

The kinds of the anionic surface active agents include higher fatty acid salts, secondary higher fatty acid salts, higher alkyldicarboxylic acid salts, primary higher alcohol sulfate salts, secondary higher alcohol sulfate salts, primary alkylsulfonic acid salts, secondary alkylsulfonic acid salts, higher alkyldisulfonic acid salts, sulfated fatty acid and fatty acid salts, sulfonated higher fatty acid salts, higher alkylphosphate salts, sulfate salts of higher fatty acid ester, sulfonic acid salts of higher fatty acid esters, sulfate salts of higher alcohol esters, sulfonic acid salts of higher alcohol esters, condensed products of higher fatty acids and protein decomposing amino acids, condensed products of higher fatty acids and amino acids, alkylol sulfate salts of higher fatty acid amides. alkylsulfonic acid salts of higher fatty acid amides, alkylcarboxylic acid salts of higher alkylsulfonamides, sulfosuccinate salts, alkylbenzene sulfonic acid salts, alkylphenol sulfonic acid salts, alkylnaphthaline sulfonic acid salts, formaline condensed products of alkylnaphthaline sulfonic acids, sulfonic acid salts consisting of alkyldiphenyl and a number of other rings, keton compounds of alkylaryl sulfonic acid salts, petroleumsulfonic acid salts, and the like.

The nonionic surface active agents include glycerol esters of fatty acids, glycol esters of fatty acids, pentaerythritol esters of fatty acids, sucrose esters of fatty acids, sorbitan and mannitan esters of fatty acids, higher alcohol condensed products, higher fatty acid condensed products, higher alkylamine condensed products, higher fatty acid amide condensed products, higher alkylmercaptane condensed products, alkylphenol condensed products, polypropylene oxide condensed products, and the like.

Representative examples of commercially available surfactants suitable for purposes of the present invention include LIPOLAN 1400 (α-olefin sulfonate) made by Lion Corporation as the anionic surface active agent, and LIPONOX NC 2Y (polyoxyethylene alkyl aryl ether) made by Lion Corp. as the nonionic surface active agent are used. Each of these is particularly suitable as the surface active agent used in the hard open cell body of the present invention.

In the case of the nonionic surface active agent, low polymerization degree polyolefins, such as liquid polypropylene and low polymerization degree polyethylene or waxes, may be substituted for the previously identified surface active agents. These alternatives are never inferior compared with the case of using the nonionic surface active agent, and their use has been found to afford an excellent open cell body. However, joint use with the anionic surface active agent is required in this case.

Representative examples of liquid polypropylene, include LPP-N108 made by Ube Industries Ltd., as low polymerization degree polyethylene, FLO-THENE UF 1.5 made by Seitetsu Kagaku Co., Ltd., and as waxes, HOECHST WAX op made by Hoechest Japan, Co., Ltd. and NISSEKI MICRO WAX 155 and 180 may by Japan Oil Co., Ltd. may be effectively. The used amounts of these surface active agents and low polymerization degree polyolefins or waxes used in accordance with the present invention are suitably in the range of 0.5 to 5.0 PHR.

The addition of the blowing agent is also a significant factor in the present invention. The blowing agent used in the present invention may be general thermal decomposing type organic blowing agents. These blowing agents include azodicarbonamide, dinitrosopentamethylenetetramine, paratoluenesulfonylhydrazide, and 4,4'-oxybisbenzenesulfonyl hydrazide, but azodicarbonamide (ADCA) is particularly suitable. Conventionally, the thermal decomposing type blowing agents have been frequently used for sponge leathers made of vinyl chloride resins, the foaming form of which is always open cells in the products using suspension polymerized vinyl chloride resins. In the above Jap. Pat. Pub. Nos. 25369/1983 and 58370/1983, the open cell bodies are resultant, but the obtained products have soft compounding system and sheet form, and there are no examples affording hard open cell body having a molding form, such as pipe and plate as in the present invention. The amount of the thermal decomposition type organic blowing agent used in accordance with the present invention varies depending on the kind of the compounding system containing the resin, the processing aid, and the stabilizer, expansion ratio and permeability, but is preferably within the range of about from 0.5 to 10.0 PHR.

In the hard open cell body of the present invention, the addition of a powderly filler, such as calcium carbonate acts effectively. As the powderly filler, chalk, silica acid, aluminium oxide, thithanium oxide, and fine powderly wood powders are suitably used in addition to the above calcium carbonate. These powderly fillers may be optionally added, as occasion demands.

Further, in the hard open cell body of the present invention, an internal lubricant, such as fatty acid esters of polyhydroxy alcohols, is required when the extrusion method is employed as the molding method. For example, LOXIOL G-12 and G-16 made by Henkel Hakusui Corp. are used as the lubricant.

Additionally, in the present invention, metal oxides, for example, zinc oxide, may be optionally added in order to control the thermal deccomposing temperature of the thermal decomposing type blowing agent.

In the hard open cell body of the present invention, addition of a plasticizer, such as DOP (di-octyl phthalate), BBP (butyl bengyl phthalate), and TCP (tricresyl phosphate) in a small amount is often effective as the means to increase the internal lubricity The previously mentioned plasticizers are described in W. V. TITLOW, PVC Technology, Fourth Edition, Elsevier Applied Science Publishers, London and New York, pp. 154, 155 and 159.

The compounding agents described above are weighed or measured at fixed amounts according to each form (pipe, plate), expansion ratio and permeability, and then mixed by means of a high speed stirrer, for example, a Henshel mixer. This mixing step is highly significant, and in order to provide homogeneous mixing. Homogeneous mixing is required under stable flow in supplying the extruder through a hopper, and is also required for the proper expansion ratio of the resultant product, prevention of scattering of the permeability, and performing stability of impact strength.

The stirring in the Henshel mixer is controled so as to be conducted at a temperature of nearly 60° C. At about this temperature, the liquid components, such as the surface active agent and the stabilizer, are rapidly and uniformly absorbed in the resin, and the waxes are also fused homogeneously dispersed, and absorbed. Further, the solidified grains of the blowing agent are decomposed to form the homogeneous mixing condition with the resin in the first grain area. Also, partial gellation of the resin and decomposition of the blowing agent do not result at this temperature so that no difficulties are experienced in maintaining the above characteristics and properties.

The powders raised to about 60° C. are, in fact, put in a cooler mixer cooled using circulating to cool the powder to the ordinary temperature, and then supplied to the extruder. This cooling converts the mixed powders to a dry powderly compounded substance having an extremely excellent fluidity. If the powder compounded material at 60° C. is retained in the mixing bath as it is without cooling, the temperature is further raised by the retained heat to cause thermal degradation change to black or decomposition of the blowing agent, so that attention must be paid to cool the powder.

The extruder used in the present invention is of nonvent type, which may be either of the single screw or twin screw type. As to temperature conditions, the standard conditions when the polymerization degree $(\overline{P})$ of the vinyl chloride resin is 700 are $C_1 = 150°$ C., $C_2 = 160°$ C., $C_3 = 170°$ C., $C_4 = 180°$ C., $C_5 = 185°$ C., and $H = 180°$ C., and when $(\overline{P})$ is 450, the conditions are made lower than this by about 5° C. to 10° C. in each barrel part.

In the extruded moldings, as the surface contacted with the die causes friction to break the foams, a thin film is formed, and thus in measuring the permeability, this film must be sanded by means of an electric plane or grinder.

The permeability is measured according to JIS P-8117 "Air permeability testing method of paper and plate paper".

The principle of this testing method involves measuring the time (second) taken for 100 ml of air to pass through the area of 645 mm² and showing the permeability by this value (second), and the permeability is practically measured using a Gurley type Densometer Model B No 158 manufactured by Toyo Seki Seisakusho. To illustrate these values for concrete examples, filter papers No. 2, No. 3, and No. 5C have 1.5–1.6 sec., 2.6–2.7 sec., and 10.6–10.7 sec., respectively, newspapers have 22.5–24.2 sec., and glassfiber filter. Millipore AP 20-055-00 has 0.7–0.8 sec. On the other hand, time for about hard open cell body obtained by the present invention is about 1.0–5.0 sec. This value corresponds to the permeability of filter papers No. 2 and No. 3. As this value can be of course changed by the compounded composition, for example, when the product is to be used as a filter element, plates having an optional permeability from those of Millipore AP20 class to those of filter paper No. 5C can be produced.

EXAMPLES

The embodiments of the present invention are further illustrated in detail by the following examples.

(1) Examples 1–2, Comparative Examples 1–8

Each compounded substance was measured based on 2.5 kg of the vinyl chloride resin amount, according to the compounding of Table 1, and stirred by means of a 9 Henshel mixer for 8 minutes. The rate of rotation was 1480 RPM. The resin temperature after 8 minute stirring was about 50° C.

TABLE 1

| Compounding Agent | Example | | Comparative Example | | | | | | | |
|---|---|---|---|---|---|---|---|---|---|---|
| | 1 | 2 | 1 | 2 | 3 | 4 | 5 | 6 | 7 | 8 |
| PVC | | | | | | | | | | |
| S-9007*1 | 100 | — | 100 | 100 | 100 | 100 | — | — | — | — |
| S-450*2 | — | 100 | — | — | — | — | 100 | 100 | 100 | 100 |
| ERATHLEN 401A*3 | 10 | 10 | 10 | 10 | 10 | 10 | 10 | 10 | 10 | 10 |
| Processing aid | | | | | | | | | | |
| METABLEN P-501*4 | — | — | — | 5 | — | — | — | 5 | — | — |
| METABLEN P-530*4 | 5 | 5 | — | — | — | — | — | — | — | — |
| KANE ACE PA-20*5 | — | — | — | — | 5 | — | — | — | 5 | — |
| KANE ACE PA-50*5 | — | — | — | — | — | 5 | — | — | — | 5 |
| MARK FL-30*6 | 3 | 3 | 3 | 3 | 3 | 3 | 3 | 3 | 3 | 3 |
| HOECHST WAX OP*7 | 2 | 2 | 2 | 2 | 2 | 2 | 2 | 2 | 2 | 2 |
| LIPOLAN 1400*8 | 2 | 2 | 2 | 2 | 2 | 2 | 2 | 2 | 2 | 2 |
| LOXIOL G-16*9 | 2 | 2 | 2 | 2 | 2 | 2 | 2 | 2 | 2 | 2 |
| AW-9*10 | 3 | 3 | 3 | 3 | 3 | 3 | 3 | 3 | 3 | 3 |
| NS #100*11 | 20 | 20 | 20 | 20 | 20 | 20 | 20 | 20 | 20 | 20 |
| Properties*12 | | | | | | | | | | |
| (1) Appearance | O | O | Xs | Xs | XB | X | XB | XB | O | Δ |
| (2) Cell form | O | O | X | Δ | Δ | Δ | X | X | Δ | Δ |
| (3) Water permeability | O | O | Δ | Δ | Δ | Δ | O | O | O | Δ |
| (4) Permeability (sec) | 3.7 | 1.5 | — | — | ∞ | ∞ | — | — | 4.2 | 100 |
| (5) Specific gravity | 0.39 | 0.29 | — | — | 0.85 | 0.88 | — | — | 0.53 | 0.72 |
| (6) Viscosity (× 10³ poise) | 46.3 | 30.1 | 21.7 | 38.2 | 40.6 | 34.1 | 12.8 | 21.9 | 30.3 | 23.7 |

Notes
*1 Made by Kureha Chemical Industry, $\bar{P}$ = 700
*2 Made by Chisso, $\bar{P}$ = 450;
*3 Made by Showa Denkoh chlorinated polyethylene,
*4 Made by Mitsubishi Rayon, P-501 is an usual acrylic processing aid, P-530 is an ultramacromolecular weight acrylic processing aid,
*5 Made by Kanegafuchi Chemical Industry, acrylic processing aid,
*6 Made by Adeka Argus, K—Zn system liquid stabilizer,
*7 Made by Hoechst Japan, wax,
*8 Made by Lion Corp. anionic surface active agent,
*9 Made by Henkel Japan, internal lubricant,
*10 Made by Eiwa Kasei, ADCA system blowing agent,
*11 Made by Nitto Funka, heavy calcium carbonate,
*12 Property evaluation is conducted according to the followings.
(1) Appearance: Judged by observing the extruded product by eye O: excellent, Δ: slightly poor, Xs: fishskined, XB: partially swelled
(2) Cell form: Judged by observing the section of the extruded product by eye O: excellent, Δ: slightly poor, X: poor
(3) Water permeability: Dropping water colored with red ink on the section of the extruded product judged by the permeating condition. O: rapid, Δ: slightly slow, X: not permeated
(4) Permeability: Measured using Gurley type Densometer model B No. 158 made by TO Seiki Seisakusho, Load 567 g, Permeating area 645 mm²
(5) Specific gravity: Calculated by reckoning
(6) Viscosity: Measured using Shiimazu Flow lester C11-500 Load 70 kg, measuring temp. 180° C.

Extrusion is conducted using a single extruder having a screw diameter of 40 mm and a flat die of 2×39 mm mounted therein (VS40 Extruder made by Tanabe Plastic Kikai, Motor 11 KW, Heater 8.2 KW). The heating condition shown in Table 2 was employed as the standard. A thin smooth film was formed on the surface of the resultant plate molding body, and thus the permeability was measured after removing the film by means of an electric plane to make a disk of 3.5 mmφ having a thickness of 3.0 mm.

TABLE 2

| | $C_1$ | $C_2$ | $C_3$ | $C_4$ | $C_5$ | H | Number of screw rotation (RPM) |
|---|---|---|---|---|---|---|---|
| Ex. 1 Comp. Ex. 1–4 | 150 | 160 | 170 | 180 | 185 | 180 | 60 |
| Ex. 2 Comp. Ex. 5–8 | 150 | 160 | 165 | 170 | 175 | 170 | 60 |

The properties of the extruded products are shown in Table 1 of a separate sheet.

Examples 1 and 2, using P-530, showed extremely excellent result, while in those examples using usual acrylic acids, Comparative Example 7 showed a slightly good result but otherwise unacceptable results.

(2) Examples 3–8,
Comparative Examples 9–18

The compounded substances were prepared according to the compositions in Table 3, in the same manner as in the above (1).

EVA is used, excellent hard open cell bodies can be obtained.

Example 8 is an example using only the ultramacromolecular weight acrylic processing aid without the duplicative processing aid, and an excellent open cell body with no difficulties in practice can be obtained, although the viscosity and specific gravity become higher and the permeability slightly reduced.

In Comparative Example 9, an usual stabilizer for foaming (Ba-Zn type composite stabilizer) is used instead of FL-30, and the foaming itself is extremely excellent, but forms no open cell body. Comparative Ex-

TABLE 3

| Classification | Compounding agent | Example 3 | 4 | 5 | 6 | 7 | 8 | Comparative Example 9 | 10 |
|---|---|---|---|---|---|---|---|---|---|
| Resin | S-9007 | 100 | 100 | 100 | 100 | 100 | 100 | 100 | 100 |
| Processing aid | ERATHLEN 401A | 10 | | | 10 | | | 10 | 10 |
| | SOARBLEN CI*1 | | 10 | 10 | | 10 | | | |
| | METABLEN P530 | 5 | 5 | 5 | 5 | 5 | 5 | 5 | 5 |
| Surfactant | LIPOLAN 1400 | 2 | 2 | 2 | 2 | 2 | 2 | 2 | 2 |
| | LIPONOX NC-2Y*2 | 1 | | 1 | 1 | 1 | 1 | 1 | |
| | FLO-THEN UF-1.5*3 | | 1 | | | | | | |
| Stabilizer | K—Stearate | | | | 0.5 | 0.5 | | | |
| | Zn—Stearate | | | | 2.5 | 2.5 | | | |
| | Cd—Stearate | | | | | | | | |
| | Ba—Stearate | | | | | | | | |
| | MARK FL-30 | 3 | 3 | 3 | | | 3 | | 3 |
| | MARK OF-15*4 | | | | | | | 3 | |
| Lubricant | LOXIOL G-16 | 2 | 2 | 2 | 2 | 2 | 2 | 2 | 2 |
| Blowing agent | AW-9 | 3 | 3 | 3 | 3 | 3 | 3 | 3 | 3 |
| Filler | NS #100 | 20 | 20 | 20 | 20 | 20 | 20 | 20 | 20 |
| Properties | (1) Appearance | O | O | O | O | O | O | O | O |
| | (2) Cell form | O | O | O | O | O | O | O | O |
| | (3) Water permeability | O | O | O | O | O | O | X | X |
| | (4) Permeability (sec) | 2.5 | 3.8 | 3.2 | 3.5 | 3.9 | 5.7 | — | — |
| | (5) Specific gravity | 0.28 | 0.32 | 0.30 | 0.39 | 0.41 | 0.45 | 0.21 | 0.25 |
| | (6) Viscosity ($\times 10^3$ P) | 43.3 | 38.2 | 39.0 | 47.0 | 38.3 | 56.3 | 45.1 | 40.2 |

| Classification | Compounding agent | Comparative Example 11 | 12 | 13 | 14 | 15 | 16 | 17 | 18 |
|---|---|---|---|---|---|---|---|---|---|
| Resin | S-9007 | 100 | 100 | 100 | 100 | 100 | 100 | 100 | 100 |
| Processing aid | ERATHLEN 401A | 10 | 10 | 10 | 10 | 10 | 10 | 10 | 10 |
| | SOARBLEN CI*1 | | | | | | | | |
| | METABLEN P530 | 5 | 5 | | 5 | 5 | 5 | 5 | 5 |
| Surfactant | LIPOLAN 1400 | | | 2 | 2 | 2 | 2 | | |
| | LIPONOX NC-2Y*2 | 1 | | 1 | | 1 | | 1 | |
| | FLO-THEN UF-1.5*3 | | 1 | | 1 | | 1 | | 1 |
| Stabilizer | K—Stearate | | | 3 | 3 | | | | |
| | Zn—Stearate | | | | | 3 | 3 | | |
| | Cd—Stearate | | | | | | | 1.5 | 1.5 |
| | Ba—Stearate | | | | | | | 1.5 | 1.5 |
| | MARK FL-30 | 3 | 3 | | | | | | |
| | MARK OF-15*4 | | | | | | | | |
| Lubricant | LOXIOL G-16 | 2 | 2 | 2 | 2 | 2 | 2 | 2 | 2 |
| Blowing agent | AW-9 | 3 | 3 | 3 | 3 | 3 | 3 | 3 | 3 |
| Filler | NS #100 | 20 | 20 | 20 | 20 | 20 | 20 | 20 | 20 |
| Properties | (1) Appearance | O | O | Δ | Δ | O | O | O | O |
| | (2) Cell form | O | O | X | X | Δ | Δ | O | O |
| | (3) Water permeability | X | X | Δ | Δ | X | X | X | X |
| | (4) Permeability (sec) | — | — | >100 | >100 | — | — | — | — |
| | (5) Specific gravity | 0.24 | 0.29 | 0.63 | 0.72 | 0.46 | 0.50 | 0.41 | 0.44 |
| | (6) Viscosity ($\times 10^3$ P) | 47.6 | 46.3 | 38.1 | 42.2 | 40.7 | 44.3 | 39.0 | 43.5 |

Notes
*1 Made by The Nippon Synthetic Chemical Industry Co., Ltd.: EVA system modifier
*2 Made by Lion Corp.: Nonionic surface active agent
*3 Made by Seitetsu Kagaku Co., Ltd.: Low polymerization degree polyethylene
*4 Made by Adeka Argus Corp.: Ba—Zn system stabilizer (powder)

Examples 3 and 4 differ in chlorinated polyethylene and EVA as well as the processing aid, but EVA can be used almost equivalently, except affording a slightly lower permeability (the number of seconds is larger). The same result may be obtained if it is substituted by the nonionic surface active agent in Example 5.

Examples 6 and 7 are examples using stearic acid salts of K and Zn instead of FL-30 (K-Zn composite stabilizer), and when anyone of chlorinated polyethylene or amples 10–12 are examples using only either one of 2 kinds of surface active agents, and the foaming is excellent, but forms no open cell structure. Comparative Examples 13–16 are examples using only one of the stabilizers containing the group I metal and the stabilizer containing the group II metal, and the use of K-stearate shows slightly open cell structure but poor foaming condition, and thus is not practical. The use of only Zn stearate affords the appearance to the same degree of Comparative Example 9, but did not constitute an open cell structure because cell roughing was caused. Comparative Examples 17-18 are examples using the combined stabilizer of a Cd type stabilizer and a Ba type stabilizer, both of which examples show excellent foaming and cell conditions in regardless of kinds of the surfactants, but only afford products of closed cell structure, not forming open cell bodies.

What is claimed is:

1. An open cell body made of hard vinyl chloride resin having a composition consisting essentially of:
   (1) a vinyl chloride resin,
   (2) an ultramacromolecular weight acrylic resin processing aid having a molecular weight of at least about 1,500,000,
   (3) a stabilizer selected from the group consisting of a mixture of a first organic stabilizer containing a metal of the group I in the periodic table, a second organic stabilizer containing a metal of the group II in the periodic table, and a composite organic stabilizer containing a metal from group I and a metal from group II of the periodic table,
   (4) a surface active agent selected from the group consisting of a mixture of an anionic surface active agent and a nonionic surface active agent, and a mixture of an anionic surface agent and a member selected from the group consisting of low polymerization degree polyolefins and waxes, and
   (5) a blowing agent.

2. The open cell body in accordance with claim 1, wherein said stabilizer is a mixture of an organic stabilizer containing a metal of the group I in the periodic table and an organic stabilizer containing a metal of the group II in the periodic table.

3. The open cell body in accordance with claim 1, wherein said stabilizer is an organic composite stabilizer containing a metal of the group I and a metal of the group II in the periodic table.

4. The open cell body in accordance with claim 2, wherein said organic stabilizer comprises salts of higher fatty acids.

5. The open cell body in accordance with claim 4, wherein said salts of higher fatty acids are selected from the group consisting of ricinolic acid, deconoic acid, lauric acid, stearic acid, octanoic acid, pyrrolidoncarboxylic acid and 2 ethylhexoic acid, salts of organic acids, salts of phenol compounds, salts of unsaturated fatty acids having double bonds.

6. The open cell body in accordance with claim 5, wherein said organic acids are selected from the group consisting of aromatic carboxylic acids and heterocyclic carboxylic acids.

7. The open cell body in accordance with claim 3, wherein said organic stabilizer comprises salts of higher fatty acids.

8. The open body in accordance with claim 7, wherein said salts of higher fatty acids are selected from the group consisting of ricinolic acid, deconoic acid, lauric acid, stearic acid, octanoic acid, pyrrolidoncarboxylic acid and 2 ethylhexoic acids, salts of organic acids, salts of phenol compounds, salts of unsaturated fatty acids having double bonds.

9. The open cell body in accordance with claim 8, wherein said organic acids are selected from the group consisting of aromatic carboxylic acids and heterocyclic carboxylic acids.

10. The open cell body in accordance with claim 2, wherein said metal of group I is selected from the group consisting of lithium, sodium, and potassium, and mixtures thereof.

11. The open cell body in accordance with claim 10, wherein said metal of group I is selected from the group consisting of sodium and potassium.

12. The open cell body in accordance with claim 2, wherein said metal of group II is selected from the group consisting of magnesium, calcium, zinc, strontium, cadmium and barium, and mixtures thereof.

13. The open cell body in accordance with claim 3, wherein said metal of group I is selected from the group consisting of lithium, sodium, and potassium, and mixtures thereof and said metal of group II is selected from the group consisting of magnesium, calcium, zinc, strontium, cadmium and barium, and mixtures thereof.

14. The open cell body in accordance with claim 13, wherein said metal of group II is selected from the group consisting of zinc and barium.

15. The open cell body in accordance with claim 3, wherein said metal of group II is selected from the group consisting of zinc and barium.

16. The open cell body in accordance with claim 1, wherein the surface active agent is a nonionic surface active agent.

17. The open cell body in accordance with claim 16, wherein said nonionic surface active agent is selected from the group consisting of glycerol esters of fatty acids, glycol esters of fatty acids, pentaerythritol esters of fatty acids, sucrose esters of fatty acids, sorbitan and mannitan esters of fatty acids, higher alcohol condensed products, higher fatty acid condensed products, higher alkylamine condensed products, higher fatty acid amide condensed products, higher alkylercaptane condensed products, alkylphenol condensed products, polypropylene oxide condensed products.

18. The open cell body in accordance with claim 1 wherein said surface active agent is an anionic surface active agent.

19. The open cell body in accordance with claim 18, wherein said anionic surface active agent is selected from the group consisting of higher fatty acid salts, higher alkyldicarboxylic acid salts, primary higher alcohol sulfate salts, secondary higher alcohol sulfate salts, primary alkylsulfonic acid salts, secondary alkylsulfonic acid salts, higher alkyldisulfonic acid salts, sulfated fatty acid and fatty acid salts, sulfonated higher fatty acid salts, higher alkylphosphate salts, sulfate salts of higher fatty acid ester, sulfonic acid salts of higher fatty acid esters, sulfate salts of higher alcohol esters, sulfonic acid salts of higher alcohol esters, condenses products of higher fatty acids and protein decomposing amino acids, alkylol sulfate salts of higher fatty acid amides, alkylsulfonic acid salts of higher fatty acid amides, alkylcarboxylic acid salts of higher alkylsulfonamides, sulfosuccinate salts, alkylbenzene sulfonic acid salts, alkylphenol sulfonic acid salts, alkylnaphthaline sulfonic acid salts, formaline condenses products of alkylnaphthaline sulfonic acids, sulfonic acid salts consisting of alkyldiphenyl and a number of other rings, keton compound of alkylaryl sulfonic acid salts, and petroleumsulfonic acid salts.

20. The open cell body in accordance with claim 1, wherein the surface active agent is a mixture of an anionic surface active agent and a member selected from the group consisting of low polymerization degree polyolefins, waxes and mixtures thereof.

21. The open cell body in accordance with claim 20, wherein said member is low polymerization degree polyolefin.

22. The open cell body in accordance with claim 21 wherein said low polymerization degree polyolefin is present in the range of about 0.5 to about 5.0 PHR.

23. The open cell body in accordance with claim 20, wherein said member is a wax.

24. The open cell body in accordance with claim 23 wherein said wax is present in the range of about 0.5 to about 5.0 PHR.

25. The open cell body in accordance with claim 1, wherein said blowing agent is selected from the group consisting of thermal decomposing organic blowing agents.

26. The open cell body in accordance with claim 25, wherein said blowing agent are members selected from the group consisting of azodicarbonamide, dinitrosopentamethylenetetramine, paratoluenesulfonylhydrazide, and 4,4'-oxybisbenzenesulfonyl hydrazide.

27. The open cell body in accordance with claim 26, wherein said thermal decomposing organic blowing agent is azodicarbonamide.

28. The open cell body in accordance with claim 27, wherein said thermal decomposing organic blowing agent is present within the range of about 0.5 to about 10.0 PHR.

29. The open cell body in accordance with claim 1, further consisting essentially of compounding agents.

30. The open cell body in accordance with claim 29, wherein said compounding agents include a filler.

31. The open cell body in accordance with claim 30, wherein said filler is selected from the group consisting of calcium, carbonate, chalk, silica acid, aluminum oxide, titanium oxide, and wood powders.

32. The open cell body in accordance with claim 31, wherein said filler is calcium carbonate.

33. The open cell body in accordance with claim 1, further consisting essentially of lubricants.

34. The open cell body in accordance with claim 33, wherein said lubricants are selected from the group consisting of plasticizers and fatty acid esters of polyhydroxy alcohols.

35. The open cell body in accordance with claim 34, wherein said plasticizers are selected from the group consisting of di-octyl phthalate, butyl bengyl phthalate, and tricresyl phosphate.

36. The open cell body in accordance with claim 1, further consisting essentially of a metal oxide.

37. The open cell body in accordance with claim 36, wherein said metal oxide is zinc oxide.

38. The open cell body in accordance with claim 1, wherein said vinyl chloride resin has a polymerization degree (P) from within the range of about 400 to 1500.

39. The open cell body in accordance with claim 38, wherein said polymerization degree of said vinyl chloride resin is within the range of about 450 to about 1000.

40. The open cell body in accordance with claim 1, wherein said vinyl chloride resin is a member selected from the group consisting of vinyl chloride copolymers, ethylene vinyl acetate-vinyl chloride ternary copolymer and vinyl chloride straight polymers.

41. The open cell body in accordance with claim 40, wherein said vinyl chloride copolymers are vinyl chloride-vinyl acetate copolymers.

42. The open cell body in accordance with claim 40, wherein said vinyl chloride straight polymers are homopolymers of vinyl chloride.

43. The open cell body in accordance with claim 40, wherein said vinyl chloride resin is prepared by a polymerization method selected from the group consisting of suspension polymerization and block polymerization.

44. The open cell body in accordance with claim 1, wherein said ultramolecular, weight acrylic resin processing aid possesses the following physical properties:
   apparent specific gravity—about 0.35 g/cc,
   true specific gravity—about 1.15 g/cc,
   grain size—>98%, 30 mesh,
   volatile component—21 1.0%,
   color—white.

45. The open cell body in accordance with claim 1, wherein said ultramolecular weight acrylic resin processing aid is present in amount within the range of about 5–20 additional parts by weight based on 100 parts by weight of said vinyl chloride resin (PHR).

46. The open cell body in accordance with claim 1, where said organic composite stabilizer is a solution comprising a paraffin solvent.

47. The open cell body in accordance with claim 46, wherein said solution comprises a stabilizing aid.

48. The open cell body in accordance with claim 47, wherein said stabilizing aids are organic phosphites.

49. The open cell body in accordance with claim 48, wherein said group I metal is sodium and said group II metal is selected from the group consisting of zinc and cadmium.

50. A hard vinyl chloride for resin having a composition consisting essentially of:
   (1) a vinyl chloride resin,
   (2) an ultramacromolecular weight acrylic resin processing aid having a molecular weight of at least about 1,500,000,
   (3) a stabilizer selected from the group consisting of a mixture of a first organic stabilizer containing a metal of the group I in the periodic table and a second organic stabilizer containing a metal of the group II in the periodic table, and a composite organic stabilizer containing a metal from group I and a metal from group II of the periodic table,
   (4) a surface active agent selected from the group consisting of a mixture of an anionic surface active agent, a nonionic surface active agent, and a mixture of an anionic surface agent and a member selected from the group consisting of low polymerization degree polyolefins and waxes, and
   (5) a blowing agent.

* * * * *

UNITED STATES PATENT AND TRADEMARK OFFICE
CERTIFICATE OF CORRECTION

PATENT NO. : 4,800,214

DATED : January 24, 1989

INVENTOR(S) : Tatsuo WAKI et al.

It is certified that error appears in the above-identified patent and that said Letters Patent is hereby corrected as shown below:

At column 1, line 16, change "urethan" to ---urethane---.

At column 2, line 13, change "," to ---:--- after "components".

At column 2, line 32, insert ---i)--- before "kneading".

At column 2, line 53, delete [a] after "component".

At column 3, line 11, change "(iii)" to ---(ii)---.

At column 3, line 43, insert ---,--- after "example".

At column 3, line 56, delete [a] after "by".

At column 4, line 12, change "." to ---,--- after "method".

At column 4, line 15, insert ---of--- after "mixture".

At column 4, line 31, delete [be] after "can".

At column 5, line 1, change "vinly" to ---vinyl---.

At column 5, line 40, delete [m] before "such".

At column 6, line 10, change "methyacrylate" to ---methacrylate---.

At column 6, line 13, change "acids" to ---aids---.

At column 6, line 20, change "methyacrylate" to ---methacrylate---.

At column 6, line 21, change "is" to ---are---.

At column 6, line 22, change "was" to ---were---.

At column 6, line 24, change "has" to ---have---.

At column 6, line 33, change "adis" to ---aids---.

At column 6, line 46, change "aid" to ---aids---.

At column 6, line 50, change "Hitsubishi" to ---Mitsubishi---.

UNITED STATES PATENT AND TRADEMARK OFFICE
CERTIFICATE OF CORRECTION

PATENT NO. : 4,800,214

DATED : January 24, 1989

INVENTOR(S) : Tatsuo WAKI et al.

It is certified that error appears in the above-identified patent and that said Letters Patent is hereby corrected as shown below:

At column 6, line 56, change "possess" to ---possesses---.

At column 7, line 3, change "to to" to ---to---.

At column 7, line 31, change "aid" to ---aids---.

At column 7, lines 58/59, change "combination stabilizer" to ---stabilizer combination---.

At column 7, line 61, change "invnetors" to ---inventors---.

At column 7, line 65, change "2 ethylhexoic" to ---2-ethylhexoic---.

At column 8, line 8, change "barrium" to ---barium---.

At column 8, line 21, change "as as" to ---as---.

At column 8, line 24, change "mixing" to ---mixture---.

At column 8, line 58, change "." to ---,---.

At column 8, line 65, change "keton" to ---ketone---.

At column 9, line 35, delete [used] before "amounts".

At column 9, line 53, change "resultant, but the obtained" to ---obtained, but the resultant---.

At column 9, line 62, delete [from] before "0.5".

At column 9, line 67, change "thithanium" to ---titanium---.

At column 10, line 17, insert ---.--- after "lubricity".

At column 10, line 27, insert ---required---after "and".

At column 10, line 33, change "controled" to ---controlled---.

At column 11, line 55, delete period before "Millipore".

UNITED STATES PATENT AND TRADEMARK OFFICE
CERTIFICATE OF CORRECTION

PATENT NO. : 4,800,214

DATED : January 24, 1989

INVENTOR(S) : Tatsuo WAKI et al.

It is certified that error appears in the above-identified patent and that said Letters Patent is hereby corrected as shown below:

At column 11, lines 56/57, change "time for about hard" to --the time for the hard--.

At column 12, line 6, change "9" to --91--.

At column 12, line 7, insert --the-- before "8".

At column 13, line 68, change "anyone" to --any one--.

At column 15, line 58, i.e., claim 8, line 1, insert --cell-- after "open".

At column 16, line 50, i.e., claim 19, line 10, change "ester" to --esters--.

At column 16, line 52, i.e., claim 19, line 12, change "condenses" to --condensed--.

At column 16, line 59, i.e., claim 19, line 19, change "formaline condenses" to -- formalin condensed--.

At column 16, line 61, i.e., claim 19, line 21, change "keton" to --ketone--.

At column 17, line 17, i.e., claim 26, line 2, change "agent" to --agents--.

At column 17, line 34, i.e., claim 31, line 3, delete comma after "calcium".

At column 18, line 15, i.e., claim 44, line 2, change "ultramolecular," to -- ultramacromolecular--.

At column 18, line 20, i.e., claim 44, line 7, change "21 1.0%" to --,<1.0%--.

UNITED STATES PATENT AND TRADEMARK OFFICE
CERTIFICATE OF CORRECTION

PATENT NO.  : 4,800,214

DATED       : January 24, 1989

INVENTOR(S) : Tatsuo Waki, et al.

It is certified that error appears in the above-identified patent and that said Letters Patent is hereby corrected as shown below:

At column 18, line 23, i.e., claim 45, line 2, change "ultramolecular" to -- ultramacromolecular --.

Signed and Sealed this

Seventh Day of July, 1992

Attest:

DOUGLAS B. COMER

*Attesting Officer*    *Acting Commissioner of Patents and Trademarks*